United States Patent [19]
Walker

[11] Patent Number: 5,823,095
[45] Date of Patent: Oct. 20, 1998

[54] AUTOMATIC SHUT-OFF DEVICE FOR COFFEE MAKER

[76] Inventor: Shannon Walker, 1704 Morgan, Independence, Mo. 64050

[21] Appl. No.: 806,049

[22] Filed: Feb. 25, 1997

[51] Int. Cl.[6] ............................... A47J 31/00; H05B 1/02
[52] U.S. Cl. ............................... 99/281; 99/275; 219/518
[58] Field of Search ............................ 99/282, 281, 275, 99/292; 219/518, 507, 509

[56] References Cited

U.S. PATENT DOCUMENTS

| Re. 25,663 | 10/1964 | Bunn | 99/282 |
|---|---|---|---|
| 1,831,013 | 11/1931 | Kouyoumjian | 99/281 X |
| 2,346,389 | 4/1944 | Peters et al. | 99/282 |
| 4,744,291 | 5/1988 | Wallin | 99/280 |
| 4,838,152 | 6/1989 | Kubicko et al. | 99/280 |
| 4,872,403 | 10/1989 | Lagesse et al. | 99/280 |
| 5,239,519 | 8/1993 | Nelson et al. | 99/280 |

Primary Examiner—Reginald L. Alexander
Attorney, Agent, or Firm—Patent & Trademark Services; Joseph H. McGlynn

[57] ABSTRACT

An improved coffee maker is disclosed. The coffee maker shuts off automatically when the level of coffee in the decanter drops below a certain point, or when the decanter is removed. A housing is provided with the conventional elements used to brew coffee. The invention further comprises a decanter platform biased upward by a helical spring, the platform engaging switches which control the flow of electrical current to the brewing and heating elements of the coffee maker. When the decanter is at least partially full, the decanter platform is depressed and the switches are biased to the "on" position. When the decanter is almost empty, the upward travel of the decanter platform shuts off the heating element switch. When the decanter is removed from the platform, the brewing mechanism is shut off.

6 Claims, 1 Drawing Sheet

AUTOMATIC SHUT-OFF DEVICE FOR COFFEE MAKER

BACKGROUND OF THE INVENTION

The present invention relates generally to a drip-type coffee maker, and in particular to a coffee maker which cuts the flow of electricity to the decanter heating element when the level of coffee in the decanter falls below a certain level.

DESCRIPTION OF THE PRIOR ART

The typical drip-type coffee maker is equipped with a heating element positioned below the decanter to maintain the temperature of the coffee. If the coffee maker is left unattended for an extended period, the heating element will char the decanter when the coffee evaporates. The decanter is then virtually impossible to clean. This arrangement also poses a serious fire hazard.

Device are known which automatically shut off the heating element of coffee makers and other appliances. U.S. Pat. No. 4,838,152 describes a coffee maker with an insulated carafe which turns itself off at a specified time after the completion of a brew cycle.

U.S. Pat. No. 5,239,519 describes an apparatus for maintaining the temperature of hot drinks or food, comprising a timer which resets to zero and measures elapsed time between brewing cycles. The drawback of employing timers to maintain the temperature of coffee, however, is that the coffee may be consumed before the specified time is reached, resulting in unwanted heating or charring of the empty decanter.

Other devices have been disclosed in an attempt to improve the operation of drip-type coffee makers. U.S. Pat. No. 4,744,291 describes a coffee maker comprising a check valve which can be adjusted to control the temperature of the coffee.

U.S. Pat. No. 4,872,403 discloses a coffee maker having a means to attach the coffee maker to a constant water supply. These devices do not address the danger of overheating the coffee decanter.

There remains a need for a coffee maker which automatically shuts off when the coffee in the decanter has been depleted. Additionally, there remains a need for a coffee maker which automatically stops brewing if the decanter is removed during the brewing process. As described below, the present invention provides these and other advantages over the prior art inventions.

SUMMARY OF THE INVENTION

The present invention is a device, primarily for use with drip-type coffee makers, which monitors the level of coffee in the decanter and automatically shuts off the flow of electricity when the level of coffee falls below a specified point. The device also automatically shuts off the power to the coffee maker when the decanter is removed during the brewing process.

The invention comprises a base mounted on a helical spring. The base contains an electrical heating element for maintaining the temperature of a coffee decanter placed thereon. The base has an engaging portion which contacts a pivotal lever. The lever, in turn, engages switches which control the flow of electricity to the heating element and to the brewing mechanism. When the spring is compressed by the weight of a full or partially full decanter, the switch on the heating element circuit is biased to the "on" position. When the coffee in the decanter falls below a certain level, the heating element switch is pushed to the "off" position.

The switch controlling the brewing mechanism is engaged when the decanter is actually removed from the base. When this occurs, the flow of electricity to the brewing mechanism is shut off, thereby avoiding spillage of coffee from the brewer onto the heating element. Thus, the weight of the empty decanter on the base is sufficient to engage the brewing mechanism so the coffee can be made, but the heating element is not engaged until a certain amount of coffee is dispensed into the decanter.

The invention thus avoids accidental charring of the decanter and eliminates the resulting fire hazard and other problems. The decanter can also be removed during the brewing process without causing a mess, since the brewer is shut off when the decanter is removed for any reason.

Accordingly, it is an object of this invention to provide an improved coffee maker.

It is a further object of this invention to provide an improved coffee maker which automatically shuts off power to the decanter heating element when the level of coffee drops below a certain point.

It is still further an object of this invention to provide an improved coffee maker which shuts off power to the brewing mechanism when the decanter is removed.

These and other objects and advantages of the present invention will become readily apparent from the detailed description below, when taken in conjunction with the annexed drawings.

DESCRIPTION OF THE PREFERRED EMBODIMENT

Figure 1:
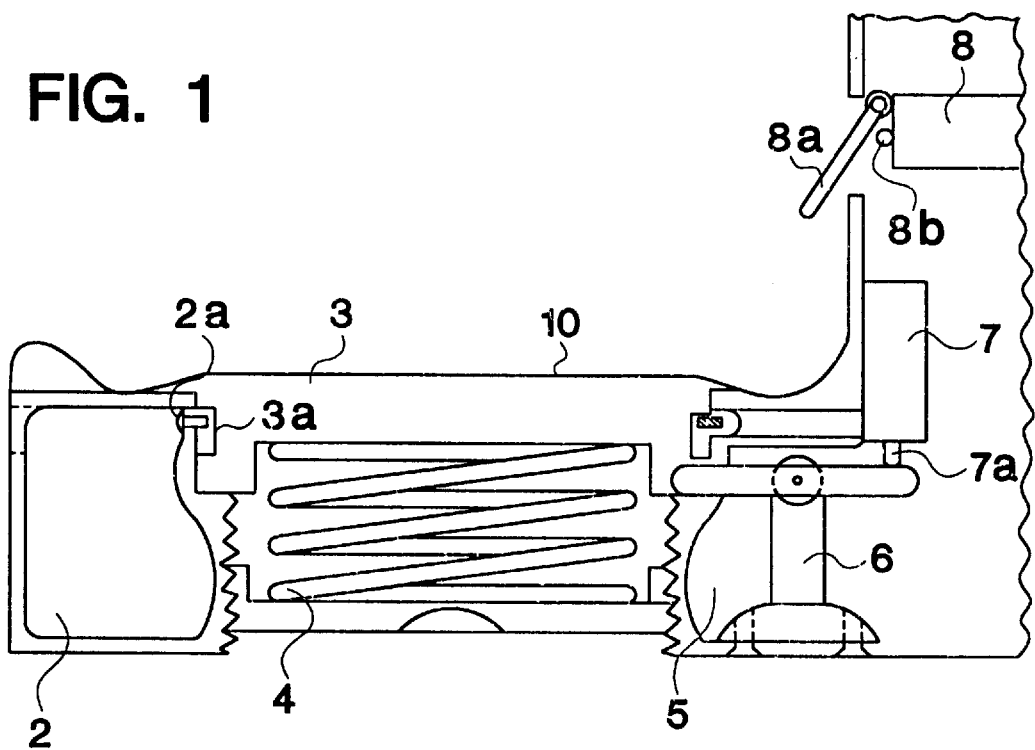
FIG. 1 shows a side elevational view of the coffee maker of the present invention, with certain parts being cut away and/or shown in section.

Referring now to the drawings in greater detail, it can be seen in FIG. 1 that the present invention 1 comprises a housing 2, a decanter platform 3, and a helical spring 4. The housing 2 contains all the necessary components commonly used in the art for brewing coffee, including a water reservoir, a heating and pumping system, and a coffee basket (not shown). The decanter platform 3 contains a conventional electric heating element (not shown).

The decanter platform 3 is movably mounted atop the helical spring 4. Notched portion 3a on the side of the decanter platform 3 engages with stop tab 2a on the housing 2, allowing the decanter platform 3 approximately one inch of vertical travel. The decanter platform 3 is biased upward by the helical spring 4. The helical spring 4 is compressed when a decanter (not shown) is placed on the decanter platform 3, resulting in downward travel of the decanter platform 3.

A pivoting lever 5 is attached to a mount 6 on the housing 2. The lever 5 engages at one end with the underside of the decanter platform 3, and contacts with a heating element switch 7, 7a at its other end. The heating element switch 7 operates on the circuit supplying current to the heating element in the decanter platform 3. The heating element switch 7 is preferably provided with a spring-biased operating button 7a which, when depressed, closes the circuit to permit the flow of electrical current. When the decanter platform 3 is depressed, by the weight of a partially full decanter, the lever 5 biases the heating element switch operating button 7a to the "on" position (up as shown in FIG. 1). When the decanter is nearly empty, the resultant upward travel of the decanter platform 3 under the influence of the spring 4, causes the lever 5 to disengage from the heating element switch operating button 7a, which allows the button 7a to move down, thereby ceasing the flow of electricity to the heating element.

A brewing mechanism switch 8 is provided on the circuit which supplies current to the brewing mechanism in the housing 2. The brewing mechanism switch 8 is preferably provided with an arm 8a which engages a spring-biased operating button 8b. When the arm 8a is in the down position, the button 8a is depressed and the switch is closed to permit the flow of current. When the arm 8a is pushed upward, the button 8b is released, opening the circuit. That is, the brewing mechanism switch shuts off current to the brewing mechanism only when the decanter is removed from the decanter platform 3. Thus, the placement of an empty decanter on the decanter platform 3 sufficiently depresses the platform to permit the flow of electricity to the brewing mechanism, so that coffee may be brewed. When a sufficient amount of coffee has been dispensed into the decanter, the heating element switch 7 is engaged and the heating element warms the coffee.

Figure 2:
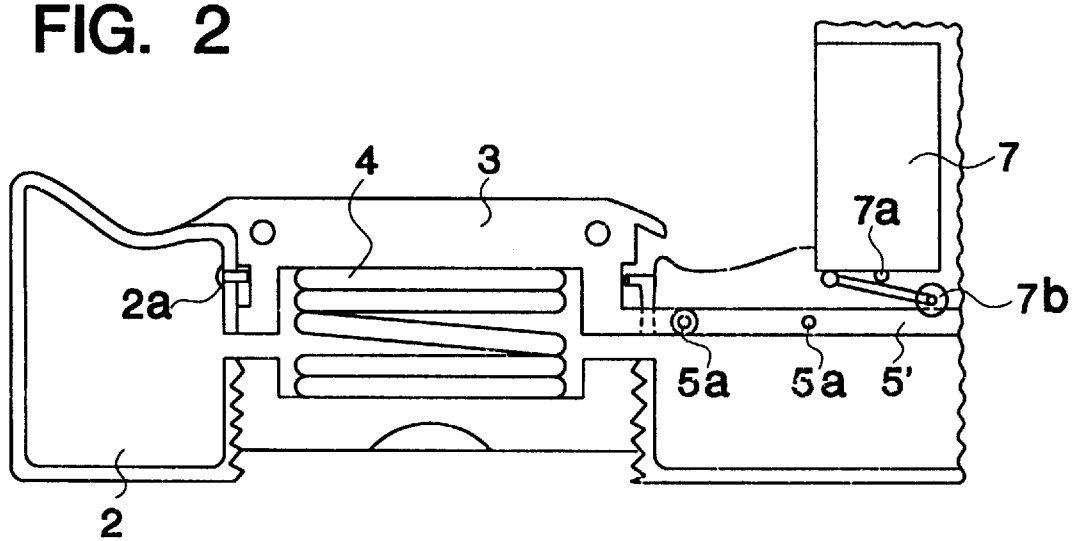
FIG. 2 shows a side elevational view of an alternative embodiment of the present invention.

FIG. 2 depicts the present invention 1 with an alternative mechanism for shutting off the flow of electricity to the heating element and the brewing mechanism. As shown in FIG. 2, the lever 5' is pivotally attached at 5c to the decanter platform 3. The heating element switch 7 is provided with a pivotally mounted arm 7b which engages the operating button 7a. The downward travel of the decanter platform 3 causes downward movement of end 5a, which pivots arm 5' about pivot 5c, which causes upward movement of the opposite end of the lever 5', engaging the arm 7b, which in turn engages with the operating button 7a.

Although the coffee maker and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. An automatic electrical shutoff for coffee brewing machine comprising:

a housing, a movable platform attached to said housing, said platform having resilient biasing means attached thereto for holding said platform in a first position, said platform adapted to have a heating element therein for keeping liquid in a container, placed on said platform, warm, first switch means adapted to be connected between a source of electricity and a heating element for turning said heating element on and off, said first switch means being in the off position when said platform is in said first position, first switch operating means for engaging said platform at one end and for engaging said switch means at a second end for operating said first switch means, whereby when a container is placed on said platform, said platform will move to a second position allowing said first switch operating means to move in a first direction to engage and turn on said first switch means, and when said container is removed from said platform, said platform will move to said first position allowing said first operating means to move in a second direction to disengage from and turn off said first switch means, second switch means adapted to be connected between a source of electricity and a heating mechanism for heating water to brew coffee, second switch operating means engageable with a portion of said platform at one end and engageable with said second switch means at a second end for turning said heating mechanism, for heating water to brew coffee, on and off, whereby when a container is placed on said platform, said platform will move to a second position and thereby move said one end of said second switch operating means in a first direction, and will move said second end of said second switch operating means in a second direction, and when said second switch operating means moves in said second direction it will engage said second switch and move said second switch to an operating position.

2. The automatic electrical shutoff for a coffee brewing machine as claimed in claim 1, wherein said resilient biasing means is a coil spring.

3. The automatic electrical shutoff for a coffee brewing machine as claimed in claim 1, wherein said housing contains limiting means for limiting the amount said platform may move.

4. The automatic electrical shutoff for a coffee brewing machine as claimed in claim 1, wherein said first switch operating means is a lever which is supported at a center point, a first end of said lever engages said platform, and a second end of said lever engages said first switch means, whereby when said platform moves from said first position said platform moves said first end of said lever, which moves said end of said lever, which operates said switch.

5. The automatic electrical shutoff for a coffee brewing machine as claimed in claim 1, which said first switch operating means is a lever which is supported at a center point, a first end of said lever engages said platform, and a second end of said lever engages a free end of a second lever, said second lever engages said first switch means, whereby when said platform moves platform moves from said first position said platform moves said first end of said lever, which moves said second end of said lever, which moves said second lever to operate said switch.

6. The automatic electrical shutoff for a coffee brewing machine as claimed in claim 1, wherein said second switch operating means is normally biased into a first position, said platform moves said second switch operating means to a second position which operates said second switch.

* * * * *